Patented Feb. 27, 1923.

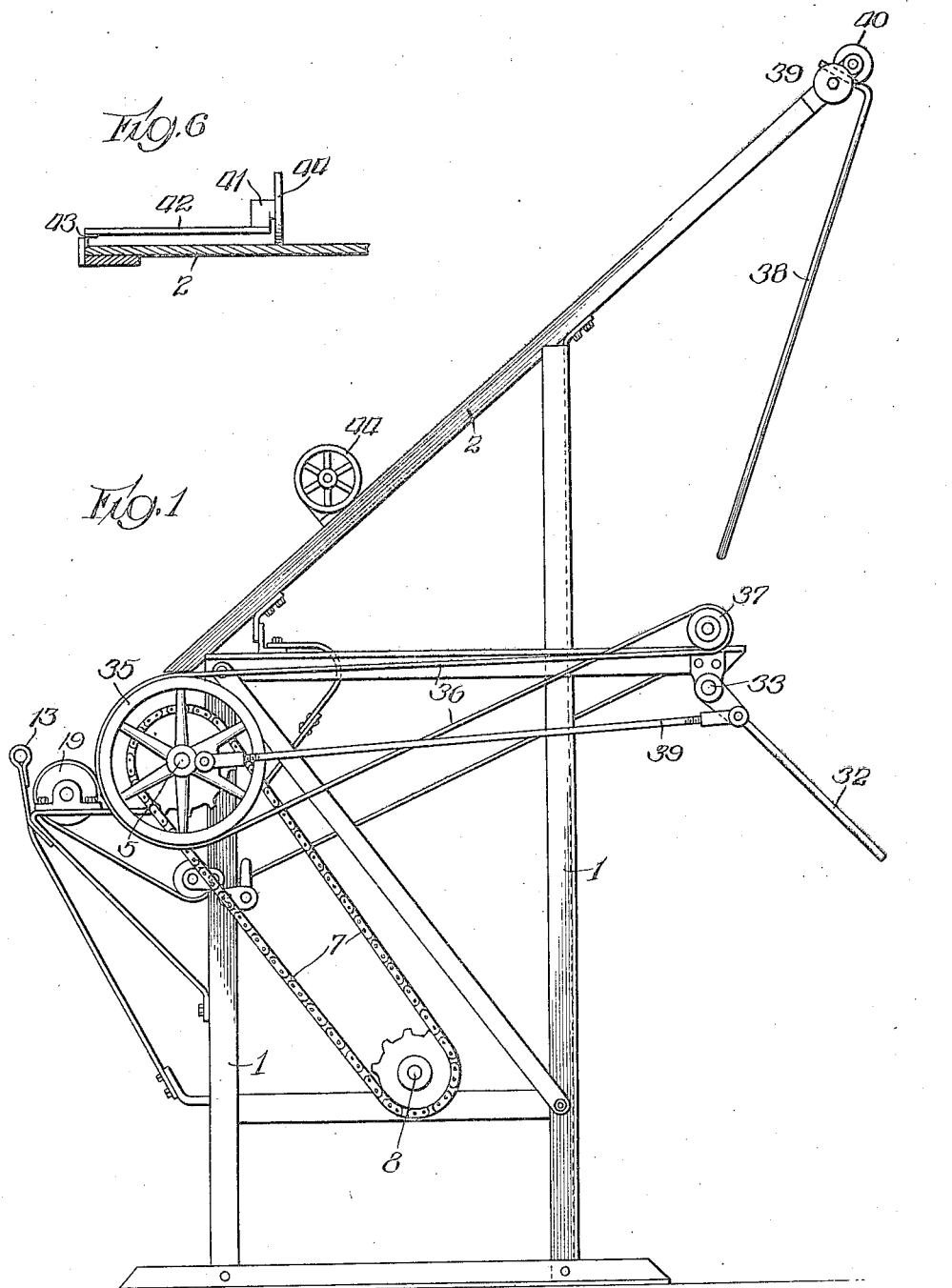

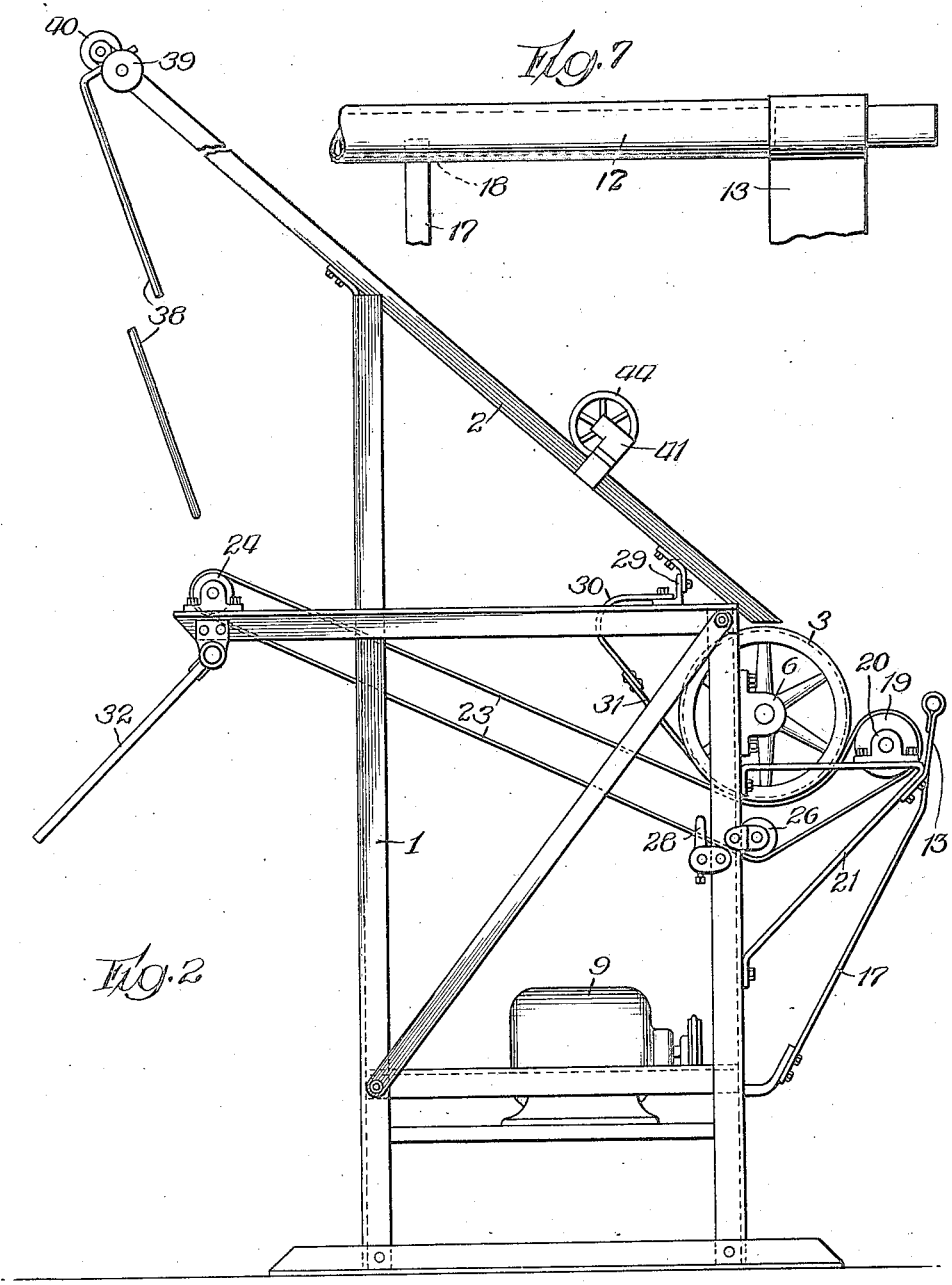

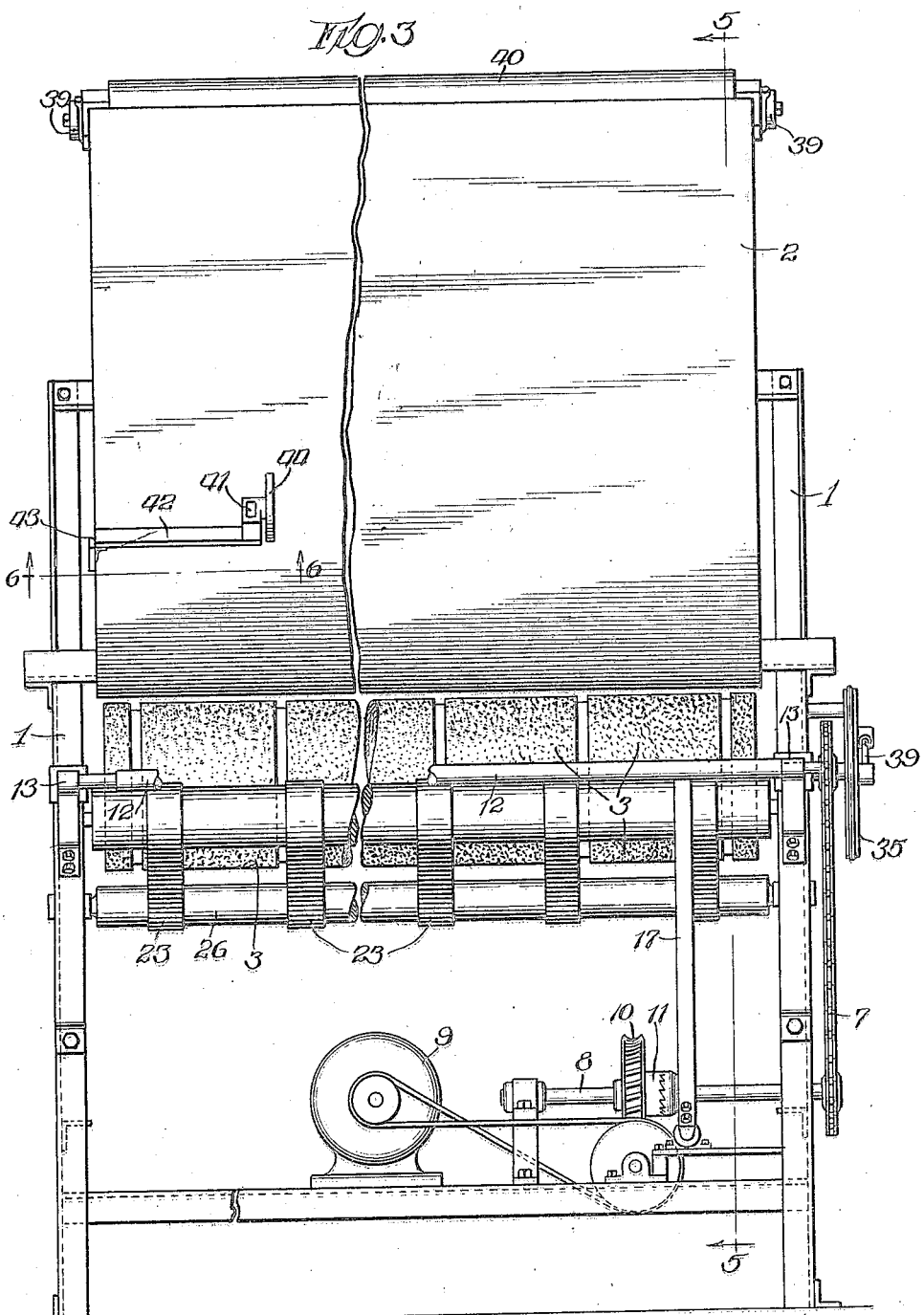

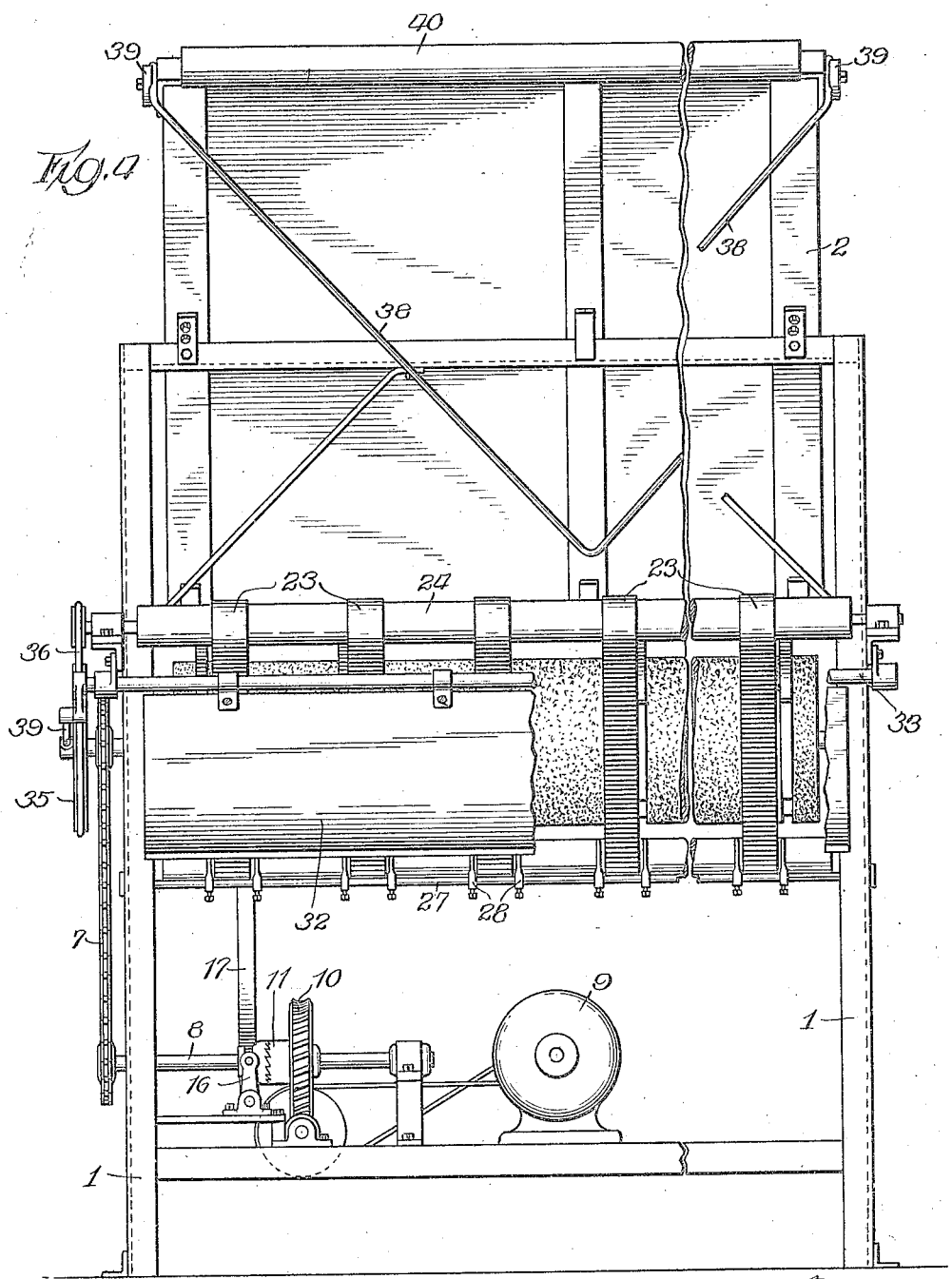

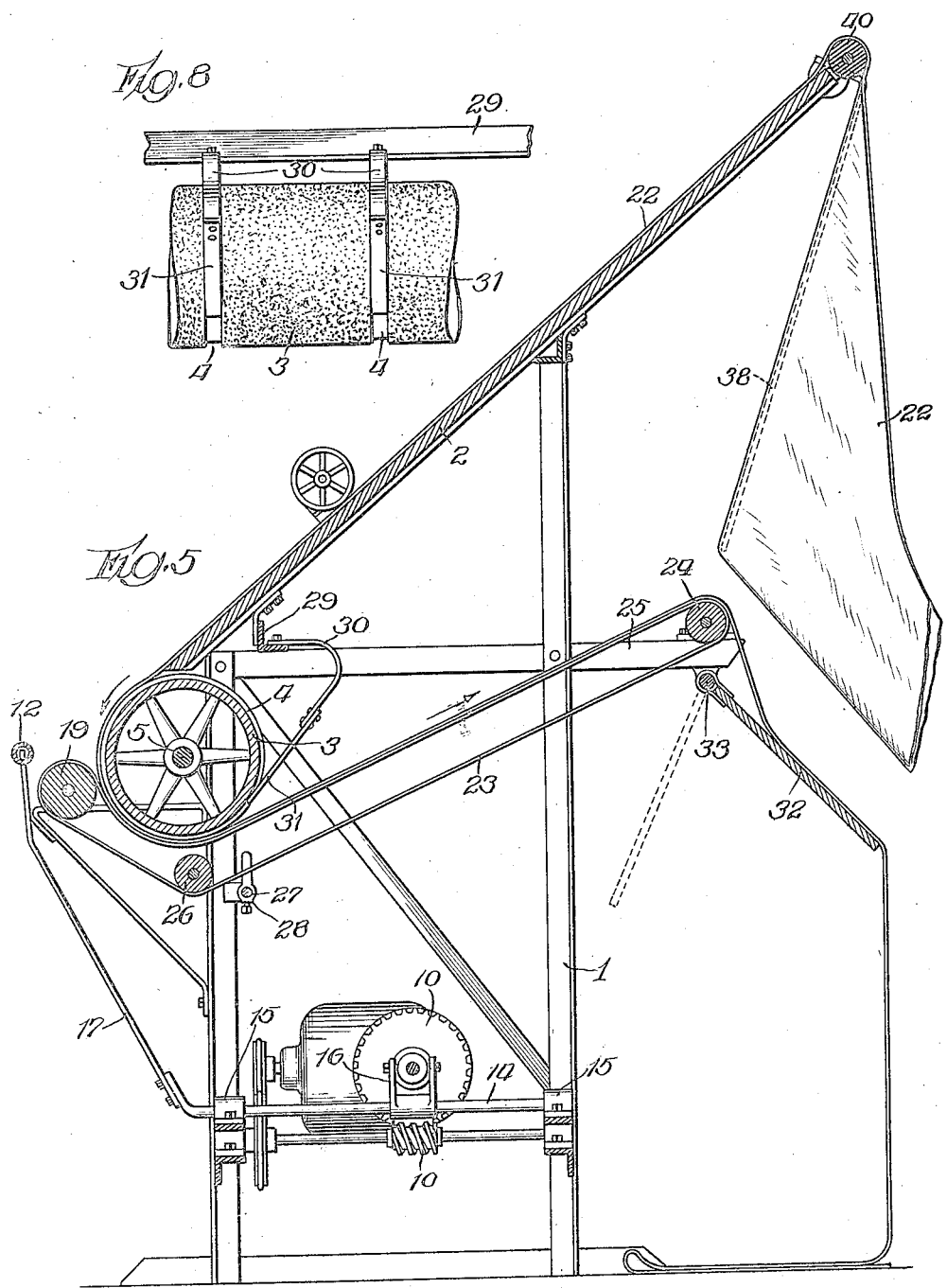

1,446,495

UNITED STATES PATENT OFFICE.

HERMAN D. BRENNER, OF CHICAGO, ILLINOIS, ASSIGNOR OF ONE-FOURTH TO H. T. SPIESBERGER, ONE-FOURTH TO MILTON M. COHN, AND ONE-FOURTH TO CLARENCE A. COHN, ALL OF CHICAGO, ILLINOIS.

CLOTH EXAMINING AND MEASURING MACHINE.

Application filed November 8, 1920. Serial No. 422,770.

*To all whom it may concern:*

Be it known that I, HERMAN D. BRENNER, of Chicago, Cook County, Illinois, have invented a certain new and useful Improvement in Cloth Examining and Measuring Machines, of which the following is a specification.

This invention relates to machines for examining cloth, or to machines for measuring cloth, or machines for both purposes, such as those employed by manufacturing tailors, or in other establishments where large quantities of cloth are handled.

Generally stated, the object of the invention is to provide an improved construction and arrangement whereby the cloth will travel over a surface, when it is spread out, so that the surface is covered by the full width of the cloth, and whereby the inspector or attendant operating the machine may control the movement of the cloth at will, so that the cloth can be stopped whenever such is necessary or desirable.

Another object is to provide an improved construction and arrangement whereby the cloth is automatically measured as it travels down hill on an inclined table or other surface, under the control of the operator or attendant.

A further object is to provide an improved construction and general arrangement, and a combination of elements or instrumentalities, whereby means are provided for facilitating examination of the cloth, and whereby the cloth is automatically measured as it travels along.

It is also an object to provide certain details and features of construction and combinations tending to increase the general efficiency and desirablity of a machine of this particular character, or any machine constructed to receive cloth for any necessary or desired purpose.

To these and other useful ends the invention consists in matters hereinafter set forth and claimed and shown in the accompanying drawings in which:

Figure 1 is a side elevation of a cloth examining and measuring machine embodying the principles of the invention, Figure 2 is a similar view showing the other side of said machine, Figure 3 is a front elevation of said machine, Figure 4 is a rear elevation of said machine, Figure 5 is a vertical section on line 5—5 in Figure 3, Figure 6 is a detail section on line 6—6 in Figure 3, Figure 7 is an enlarged detail view of a portion of the controller by which the operator or inspector controls the movement of the cloth, Figure 8 is a detail view of a portion of the main feed roll, showing adjacent portions of the machine.

As thus illustrated, the invention comprises an upright frame 1 upon which the table 2 is supported in an inclined position, practically at about an angle of forty-five degrees, as shown, the upper end of said table or incline overhanging the rear side of the machine for some distance. A rotary member 3 in the form of a feed roll having grooves 4 is mounted on a shaft 5 which is supported in suitable bearings 6 on the said body frame. This shaft, and, therefore, the large feed roll 3, are driven positively by a sprocket chain 7 which extends to the sprocket on the lower shaft 8, the latter being supported in suitable bearings on the lower portion of the body frame. The shaft 8 is driven by a motor 9, through the medium of a worm gearing 10 of any suitable character, and through a clutch 11 which can be opened and closed to start and stop the operation of the machine. A suitable controller for this clutch comprises a transverse handle or cylindric member 12 supported in bearings 13 on the body frame, said controller being movable endwise, to a limited extent, in said bearings. A rock shaft 14 is mounted in bearings 15 on the lower portion of the body frame, and is provided with a yoke 16 for operating said clutch. An arm 17 is secured at its lower end to an upturned end portion of the rock shaft 14 and is formed at its upper end to extend through a slot 18 in the under side of the said handle or controller 12, whereby endwise movement of the latter will rock the shaft 14 and thereby open and close the clutch to control the rotation of the rotary member 3 previously mentioned. A smaller feed roll 19 is supported by suitable bearings 20 mounted on the brackets 21 secured to the front of the body frame. A slight space is left between the rolls 3 and 19, for the cloth 22, as the latter leaves the lower edge of the table 2 previously mentioned. Also, as will be seen, a plurality of belts 23 travel around the roll 19 and below the roll 3, below the cloth, to carry the latter away from the two feed rolls to a point at the rear of the machine where said belts travel around another roll 24 which is supported in suitable bearings on the projecting end portions 25 at the rear of the body frame. An idler roll 26 is mounted immediately below the roll 3 to engage the upper surface of the lower stretches of the belts 23, so that the belts are properly guided. A rod 27 extends transversely of the body frame, near the roll 26, and is provided with adjustable guides 28 for said belts, whereby the latter are maintained the proper distance apart. Below the table or incline 2 a transverse bar 29 is mounted on the body frame and provided with curved springs 30 to which are attached the straight bars 31 that engage the grooves 4, previously mentioned, so that the cloth is prevented from following the upward moving surface of the roll 3, in a manner that will be readily understood. When the cloth passes over the roll 24 it falls immediately upon the flat board 32 which is hinged at 33 on the body frame to swing about a transverse axis, so that the cloth will be swung back and forth and thereby folded back and forth on the floor below. The board or plate or member 32 thus operated constitutes a folder, and is operated by a pitman 36 connected to the belt pulley 35 on the outer end of the shaft 5, previously mentioned, so that the said folder 32 is swung back and forth in the desired manner. A cross belt 36 connects the pulley 35 with a smaller pulley 37 on the outer end of the previously mentioned roll 24, so that the latter is driven positively by the driving connection 7, previously described, thereby to prevent slippage in the feeding of the cloth. The cloth is fed to the upper end of the table 2 in any suitable or desired manner, but automatically comes from a bolt or roll on which the cloth has been doubled, so that the cloth is of double thickness, and is only one-half the width thereof. Therefore, before the cloth can be properly spread over the inclined surface of the table 2, it must be opened up or spread out flat, and means comprising the unfolder 38 are provided for this purpose. The said unfolder is preferably in the form of a rod, bent into V-shape with its apex or point extending downward, and with its upper ends mounted in rotatable supports 39 suitably carried on the upper end of said table.

With this arrangement, the unfolder 38 can be swung downward or away from the under side of the table, to change or vary the angle of said unfolder, it being understood that friction or any suitable or desired means can be employed for retaining the unfolder in any adjusted position thereof. The cloth passes upward behind said unfolder, as shown in Figure 5, and is opened up or spread apart by the converging sides or edges of the unfolder, and then travels upward through the space or opening between the side portions of the rod 38, and then over the roll 40 provided at the upper end of the table. In this way the cloth folded to a double thickness, so that it is only one-half the full width, is automatically opened and spread out before it reaches the roll 40, and then travels downward upon the upper surface of the inclined table 2 in such condition and in such a manner that the inspector or attendant standing at the front of the machine may easily examine all portions of the cloth before it travels on to the lower feed roll 3, previously mentioned. A cloth meter 41, of any suitable, known or approved character, is mounted on the end of a swinging arm 42 which is hinged to the side edge of the table at 43, said meter being provided with an operating wheel 44 which rests upon the traveling cloth. In this way the meter floats on the cloth, so to speak, and is operated by the downward motion of the cloth and will register the number of yards of cloth passing through the machine.

With the foregoing construction and arrangement and mode of operation, it will be seen that the cloth both enters and leaves the machine at the rear side thereof, the uninspected or unexamined cloth being unfolded and supplied in a spread-out condition to the top or upper edge of the inclined table, and the examined and measured cloth being discharged from the machine at a point below the unfolder 38, and caused to fold back and forth on the floor below. In this way, therefore, the cloth is all kept at the rear of the machine, out of the way of the operator or inspector, and the latter stands in front of the machine in position to control the operation thereof at will, and this is true regardless of whether the inspector or examiner is standing at the middle of the machine, or at either side thereof, because the controller handle 12, previously mentioned, extends entirely across the front of the machine, so that the movement of the cloth can be stopped instantly whenever the occasion for so doing arises.

The feed rolls may all have sanded surfaces, or any sort of surface that will prevent slippage of the cloth thereon. This machine is intended for use before the cloth is sponged, but may be used, of course, in any suitable or desired manner. The bearings for the roll 24 are preferably adjustable horizontally, in any suitable or desired manner, to tighten the belts.

In other words, the belts 23 will require different adjustments for different kinds of cloth, some cloth being light, and some heavy, so that the belts are preferably tighter or looser for different kinds of cloth. The table 2 is of any suitable material, so that the cloth will slide smoothly downward thereon. The discharge of the cloth at the rear prevents it from becoming tangled up with the working parts of the machine. A machine of this kind is useful, for example, in the manufacture of clothing, and is designed to save time and labor in the handling of large quantities of cloth before the latter reach the cutters.

The table 2 is preferably provided with a white enamel surface for the cloth to slide down upon. Also, of course, this shows up the holes or weak spots or imperfections in the cloth, as the white surface shows through wherever there is any such defect.

Thus a relatively large drum 3 with a rough surface is disposed at the lower end of the inclined table 2, and positively driven, thus ensuring sufficient friction to carry the cloth around without slipping or other trouble. The idler 19 has, preferably, a smooth surface which is close to the rough surface of the drum 3, and the belts 23 travel downward from this roll 19, and then under the drum 3, before traveling upward to the roll 24, whereby said belts and rolls are positively driven by the drum, while the roll 37 is also positively driven by the belt 36 from the wheel 35 previously mentioned. The rod 27 is movable up and down, by adjustably supporting it on the frame 1, in any suitable manner, to regulate the tension or action of the belts 23, and the roll 26 can also be adjustable to tighten or loosen said belts. If desired, the angle of the table 2 can be different from that shown, very easily, as none of the feed rolls or belts are carried by the table, and a different angle will not affect or disturb the positions and the arrangement of the feeding instrumentalities. The inclined table 2 thus provided is removable from the main frame without disturbing any of the feeding instrumentalities, as the latter are all supported independently of said table on said frame. The meter 44 is shown over the table, but it can be arranged anywhere over the cloth traveling over the table, as, for example, above the drum 3 if desired.

The cloth, of course, is spread out with the right side thereof outward, and with the wrong side underneath, so that the under side is frictionally engaged by the drum 3 as the cloth leaves the lower edge of the inclined examining surface over which it travels downward toward the front of the machine.

What I claim as my invention is:

1. In a cloth examining machine, the combination of a main frame having means thereon to provide an examining surface upon which the cloth is spread out for inspection thereof, disposed in position to render visible and noticeable any defects in the cloth, and manually controlled instrumentalities supported on said main frame and adapted for frictionally communicating power to the under side of the cloth at the edge of said surface, causing the cloth to travel toward the front of the machine over said surface under control, so that the cloth can be stopped at will, and means for delivering the examined cloth rearwardly a distance away from the front of the machine.

2. A cloth examining machine as specified in claim 1, in combination with means to unfold the cloth to its full width before reaching said surface.

3. A cloth examining machine as specified in claim 1, in combination with means to fold the cloth back and forth after it leaves the machine.

4. A cloth examining machine as specified in claim 1, in combination with a cloth meter disposed over said surface to engage and measure the cloth.

5. A cloth examining machine as specified in claim 1, said instrumentalities comprising a rotary member over and under which the cloth travels, belts below said member to support the cloth, mechanism to drive said member, a controller for said mechanism, and means whereby the rotation of said member drives said belts.

6. A cloth examining machine as specified in claim 1, said means comprising an inclined table extending downward to said instrumentalities.

7. A cloth examining machine as specified in claim 1, in combination with a folder by which the cloth is discharged from the machine, and means whereby said folder is operated by connection with said instrumentalities.

8. In a cloth examining machine, the combination of an inclined table for the cloth, a rotary friction member disposed at the lower edge of said table in position to frictionally communicate power to the under side of the cloth as it leaves the edge of said table, belts extending under said member to carry the cloth below said table and rearwardly of the machine, so that the cloth both enters and leaves the machine at the rear thereof, devices to drive said member and belts, a controller extending across the front of the machine, means to connect said controller with said devices, thereby to render said controller operative to stop the cloth at will, a folder operated by said rotary member to fold the cloth discharged from the machine, and means to unfold the cloth to its full width before it travels downward on said table.

9. A structure as specified in claim 8, and guards for said member below the table.

10. A structure as specified in claim 1, and guards for said instrumentalities below said means.

11. A structure as specified in claim 8, said member having circumferential grooves, and guards engaging said grooves below the table and above the cloth on said belts.

12. A structure as specified in claim 8, and adjustable guides for said belts below said rotary member.

13. In a machine for receiving cloth, a spreader therefor adapted to unfold the cloth to its full width before it enters the machine, and a guide roll for the cloth at the upper end of the spreader, said spreader having an opening through which the cloth must pass to reach said roll, which latter is disposed between the sides of the spreader.

14. A cloth examining machine as specified in claim 1, said means comprising an inclined table, in combination with a roll to deliver the cloth to the upper end of said table cooperating with said friction means to ensure the smooth spreading out of the cloth on said examining surface.

15. A cloth examining machine as specified in claim 1, said instrumentalities having a controller which extends across the front of the machine.

16. A cloth examining machine as specified in claim 1, said instrumentalities comprising a rotary member to provide the frictional driving contact with the under surface of the cloth, a long roll in front of said member, a long roll below said member, a third roll at the rear of the machine, belts supported on said rolls to engage the under side of said member, and a frictional driving connection from said member to the roll at the rear of the machine.

17. A cloth examining machine as specified in claim 1, said instrumentalities including means whereby the cloth both enters and leaves the machine at the extreme rear thereof, with the point of discharge directly below the point of entry above.

18. A structure as specified in claim 1, said surface being white and smooth.

19. In a cloth examining machine, the combination of an inclined table, a friction drum arranged to receive the cloth from the lower end of said table, feed belts arranged to travel downward in front of said drum, then under the drum, and then rearward and upward to a point at the rear of the machine, means to positively drive said friction drum, and means to direct the cloth to the upper end of said table.

20. A structure as specified in claim 19, in combination with means on the axis of said drum to positively drive said belts.

21. A structure as specified in claim 19, having an idler roll for said belts in front of and close to said drum.

22. A structure as specified in claim 19, in combination with a folder at the rear of the machine, and means on the axis of said drum to operate said folder.

23. In a cloth examining machine, the combination of means to provide an inclined table for the cloth, and instrumentalities supported independently of said table to pull the cloth under control over said table, said instrumentalities including a rough surface friction drum disposed at the lower end of said table to receive the cloth, and means to drive said drum.

24. In a machine of the class described, the combination of means for providing an inclined surface upon which the cloth is spread out and allowed to travel downward with the right side thereof exposed to view, and instrumentalities for causing the cloth to travel downward on said surface, said instrumentalities including a feeding drum having means to engage the under or wrong side of the cloth to positively feed the latter in the desired manner, means for driving said drum, and means to support said drum in position to receive the cloth directly from the lower edge of said examining surface.

HERMAN D. BRENNER.